No. 740,461. PATENTED OCT. 6, 1903.
R. M. NEWBOLD.
ELECTRIC LIGHTING APPARATUS FOR RAILWAY CARS.
APPLICATION FILED NOV. 15, 1902.
NO MODEL. 2 SHEETS—SHEET 1.
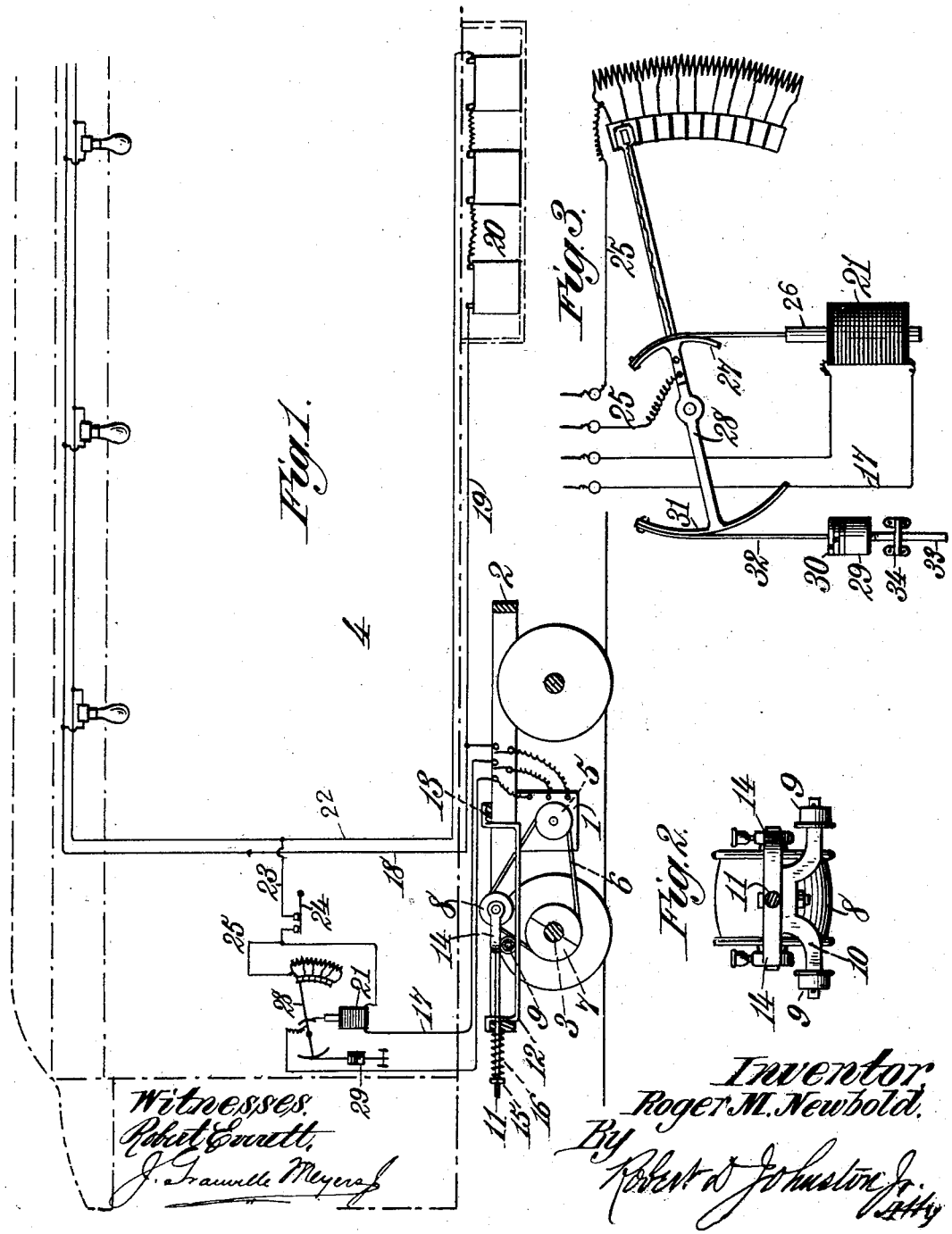

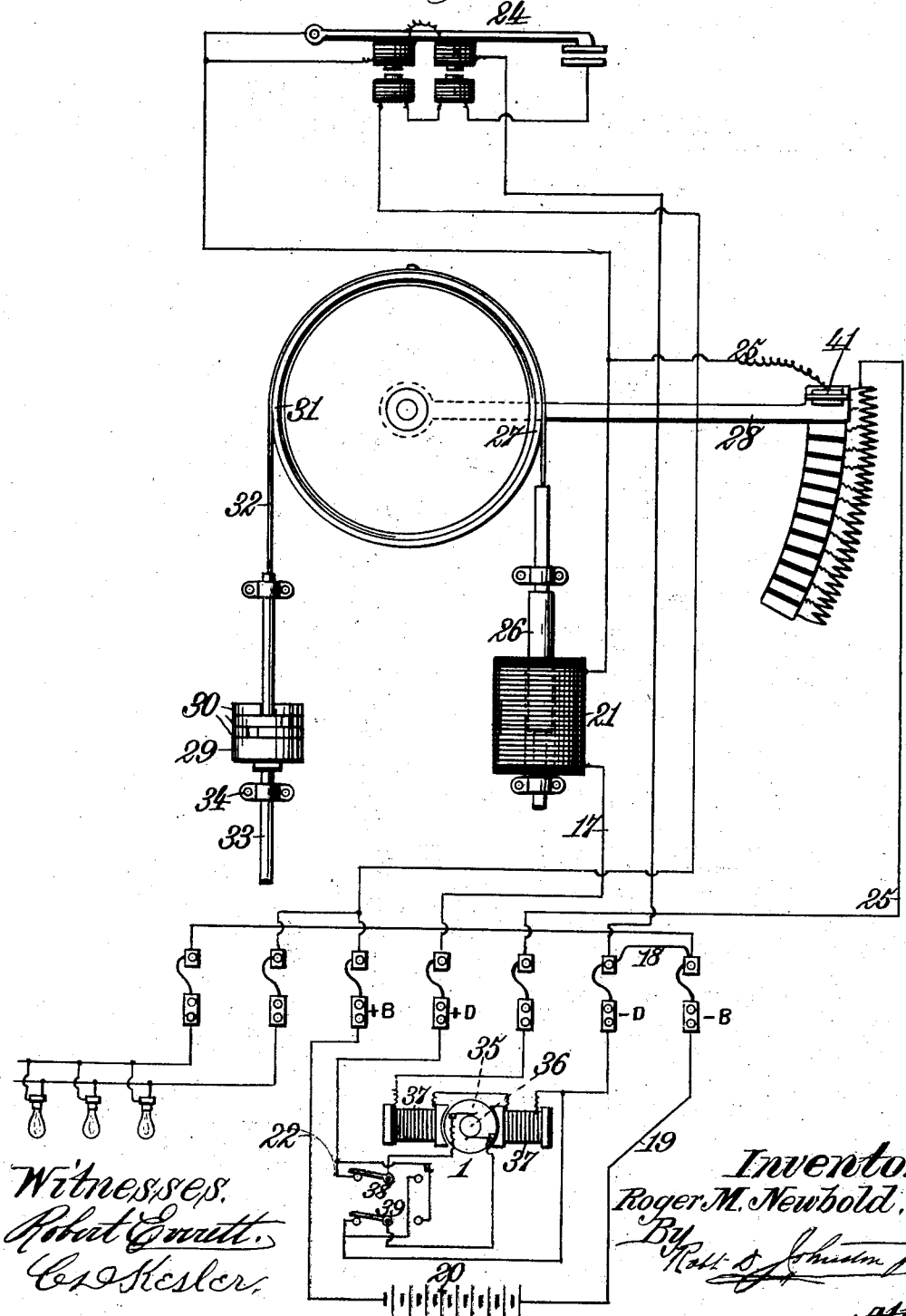

No. 740,461. Patented October 6, 1903.

UNITED STATES PATENT OFFICE.

ROGER M. NEWBOLD, OF BIRMINGHAM, ALABAMA.

ELECTRIC-LIGHTING APPARATUS FOR RAILWAY-CARS.

SPECIFICATION forming part of Letters Patent No. 740,461, dated October 6, 1903.

Application filed November 15, 1902. Serial No. 131,835. (No model.)

*To all whom it may concern:*

Be it known that I, ROGER M. NEWBOLD, a citizen of the United States, residing at Birmingham, Jefferson county, State of Alabama, have invented certain new and useful Improvements in Electric-Lighting Apparatus for Railway-Cars, of which the following is a specification.

My invention relates to systems for electrically lighting railway-cars wherein a dynamo driven by an axle of the car supplies the current to the lamps and to a storage battery carried by said car and designed to supply a current for the lamps when the car is stationary or moving below a certain speed.

It is the object of my invention to provide an improved system of this character wherein a simple and effective regulating device controls the magnetization of the dynamo, so that a current of unvarying voltage will be supplied thereby to the lamps regardless of the speed of the car. My system also comprises a novel mechanism for transmitting motion from the car-axle to the dynamo-pulley, which is capable of taking up the maximum stretch of a driving-belt and keeping it to its work until worn out.

My invention consists in the particular construction and arrangement of parts hereinafter described, and more particularly pointed out in the claims, reference being had to the accompanying drawings, forming a part of this specification, and in which—

Figure 1 shows a car fitted up with my system and belt-tension-adjusting device. Fig. 2 is a detail view of the tension-idler. Fig. 3 is a detail view of the regulator. Fig. 4 is a diagrammatic view showing the circuits of the system in plan.

The dynamo 1 is suitably mounted on the truck 2 and supported on a level with the axle 3 of the car 4. A pulley 5 is keyed on the armature-shaft of said dynamo and is driven by a belt 6, passing around said pulley 5, a split pulley 7, keyed to the axle 3, and a tension-adjusting idler 8. This idler has antifriction-rollers 9, mounted on an axle 10, which is swivelly connected to an adjusting-rod 11. I provide a trackway for said rollers composed of two bent metal strips 12, suitably secured to the truck and spaced apart sufficiently to permit the belt 6 to pass up between them and over the idler, which is mounted on the inner bifurcated end of the rod 11. The screw-threaded outer end of said rod, which extends forward of the truck through an opening in its end beam, carries a thumb-screw 15, which engages and adjusts the tension of a coiled spring 16 surrounding the rod.

The provision of the trackway and antifriction-rollers makes an extended adjustment of the idler practical by enabling it to respond readily and accurately to the influence of the coiled spring throughout its entire movement over the track, which is sufficient to compensate the full stretch of the driving-belt.

The dynamo 1, which is driven by these means, has an armature 35, commutator 36, and cores 37 of the field-magnets, which are in a derived circuit from the dynamo-mains. The dynamo-leads are connected to posts 38 and 39 of any suitable pole-changing device, which is preferably mechanically operated from the armature-shaft. By this means the connections between the dynamo and the main leads 17 and 18 are reversed upon the reversal of direction of rotation of the armature-shaft, so that the current passes always in the same direction through said leads. Treating the lead 17 as the positive main it passes from the binding post D at the distribution-box through the coils of a solenoid 21 in series therewith to one of the contact-lips of an automatic cut-out switch 24. The negative main 18 leads to a binding-post D and then connects with the negative wire 19 of the storage battery 20 at its binding-post B, from which both leads continue to the lamp-circuit. The positive battery-wire 22 leads to the binding-post B, where it branches, one side leading to the lamp-circuit and the other to one of the contact-lips of the switch 24. When this switch is open, the dynamo-main 17 is broken at this point and the lamps are being supplied with current from the battery, with which they are in circuit through the wires 22 and 19. This switch will be maintained open so long as the current generated by the dynamo is weaker than that of the batteries, so that they will not discharge through the dynamo. When the dynamo is generating voltage greater than that of the battery, the switch will close and the lamps will then be supplied by the dynamo and the surplus current will be stored in the battery. If desired, an electromagnetic cut-out switch may be used, in which case one set of magnets are in a shunt across the mains 17 and 18, and the opposing set are in series with the positive battery-wire, both being suitably wound and connected up to operate in the usual manner to securely hold the switch closed while the lamps are being supplied by the dynamo.

If no regulating device were interposed when the lamps are being supplied by the dynamo, it is evident that they would be subjected to variations in current according to the speed at which the car is running. This difficulty is encountered in all single-battery systems of this character and requires the interposition of a regulator, which will supply the lamps with a current of unvarying voltage, regardless of the speed of the car and the generation of the dynamo. I effect this regulation by interposing resistances in the derived circuit 25, containing the field-coils of the dynamo, by means of the apparatus shown in detail in Fig. 3. The solenoid 21 is energized by the dynamo-mains and has its core 26 connected by a belt or other flexible connection to the upper convex face of a curved plate or sector 27, bolted to the pivoted switch-lever 28 forward of its pivot-point. This plate curves in an arc corresponding with that described by the movement of the switch-lever around its pivot and enables the core 26 to exert a vertical pull on the lever at all points of its movement. The field-circuit 25 branches from the main 17 and, connecting to the lever 28, runs forward thereon to a contact-point 41, from which it passes through a variable resistance, over which said contact-point moves, to the coils of the dynamo and thence to the negative main 18. The solenoid 21 being in the positive dynamo-lead is affected by every variation in the current and through its core 26 and the flexible connection therefrom to the lever it tends to move the latter over the contact-plates of the several resistance-coils to increase or diminish the magnetization of the field-cores. It is most essential, where an accurate regulation is required, to provide means for counteracting or counterbalancing the pull of the core 26, which will be not only positive and unvarying in its action, but also capable of standing the rough usage to which it will necessarily be subjected on a railway-car. With these ends in view I suspend from one end of lever 28 a weight 29, designed to counterbalance the weight of the core 26 and provided with a number of removable regulating-weights 30, which when added to weight 29 are used to balance the system at any desired number of amperes at which it is to be regulated. By varying the number of the weights 30 the magnetization of the fields may be built up more or less rapidly, as may be desired, since by this means the number of amperes which the dynamo must be generating before the solenoid 21 will be sufficiently energized to overcome the inertia of the counterbalance-weight will be raised or lowered. Obviously, also, the balancing of the solenoid-core and the weight will make the regulator very sensitive to current variations and at the same time will overcome the tendency of the lever to oscillate or vibrate responsive to shakes and jolts, which would result if either largely overbalanced the other. If these counterbalance-weights be mounted rigidly on the lever 28, it is obvious that there must be a variation in the leverage which they exert on said lever as it swings above or below a horizontal position, since the movement is in the arc of a circle. The greatest accuracy being required for the successful regulation of such systems, I have provided a device to overcome this variation. On the end of the lever 28 I mount a vertically-disposed plate or sector 31, curved to correspond with the arc of a circle described by said lever as a radius from its pivot as a center. To the convex face of this plate I attach a flexible belt or chain 32 and suspend therefrom the counterbalance-weights. I provide a suitable guide-rod 33 for said weights, which passes through guides 34 and serves to steady the weight in its vertical movements and prevent its swinging or jerking. Since the belt hangs from a curved plate of the character described, it is obvious that there will be no variation in its pull upon the lever and that its movement will always be in the same vertical line. By these means I secure a regulation which is simple, not liable to get out of repair, and sensitive to a variation of one ampere, for any variation in the magnetic force of the solenoid, caused by the increase or diminution of the voltage generated by the dynamo, serves to move the core and switch-lever 28, connected therewith, and thus throw in or cut out resistances in the field-circuit.

Having thus described my invention, what I claim as new, and desire to secure by Letters Patent, is—

1. The combination in a car-lighting system, of a dynamo having its armature mechanically rotated by the movement of a car, of a main circuit, an electromagnet therein, a pivoted switch-lever moved by said magnet, circuit connections controlled by said switch-lever for varying the magnetization of the dynamo according to the current in the main circuit, a counterbalance-weight for said switch-lever, and means restraining the movements of said weight to the same vertical line with respect to said pivoted lever.

2. The combination in a car-lighting system, of a dynamo having its armature mechanically rotated by the movement of a car, of a main circuit, a solenoid therein, a pivoted switch-lever moved by said solenoid, circuit connections controlled by said switch-lever for varying the magnetization of the dynamo according to the current in the main circuit, counterbalance-weights for said switch-lever comprising a weight to balance the solenoid-core, and a weight to balance the pull of the solenoid at any desired number of amperes at which the system is to be regulated, and means restraining the movements of said weights to the same vertical line with respect to said lever.

3. The combination in a car-lighting system, of a dynamo mechanically driven from the car-axle, a main circuit, a solenoid therein, a switch-lever pivoted intermediate its ends which is moved by the core of said solenoid, circuit connections for varying the magnetization of the dynamo according to the current in the main circuit, counterbalance-weights flexibly suspended from one end of said lever and means restraining the movements of the solenoid-core and the counterbalance-weights to the same vertical lines with respect to the pivoted switch-lever, said weights being adapted to balance the solenoid-core and the pull of the solenoid at any desired number of amperes at which the system is to be regulated.

4. The combination in a car-lighting system, of an axle-driven dynamo, a main circuit, a separate circuit comprising the field-coils of the dynamo, a solenoid electrically connected with said main circuit and a core therefor, a switch-lever pivoted intermediate its ends and moved by said core, circuit connections for varying the magnetization of the dynamo according to the current in the main circuit, a curved plate carried by one end of said lever, a regulated counterbalance-weight flexibly suspended from said plate and adapted to balance the pull of the solenoid exerted on the other end of said lever, and means to guide and steady said weight in its movements.

5. The combination in a car-lighting system, of a dynamo having a shunt-wound field, a main circuit, a solenoid therein and a core therefor, a field-circuit, a rheostat therein having a pivoted switch-arm operated by said solenoid to vary the strength of the fields according to the current in the main circuit, sectors carried by said lever on each side of its pivotal point, flexible connections from the convex faces of said sectors, one of which connects to the solenoid-core, the other having suspended therefrom a counterbalance-weight, a guide-rod on which said weight is mounted and suitable guides therefor.

In testimony whereof I have hereunto set my hand in presence of two subscribing witnesses.

ROGER M. NEWBOLD.

Witnesses:
R. D. JOHNSTON,
R. D. JOHNSTON, Jr.